(12) United States Patent
Gibson et al.

(10) Patent No.: US 8,205,156 B2
(45) Date of Patent: Jun. 19, 2012

(54) DETERMINING A HIGH CONTRAST DISPLAY SETTING ON A CLIENT DEVICE TO PROCESS A WEB DOCUMENT

(75) Inventors: Becky J. Gibson, Westford, MA (US); Douglas E. Hays, Nicholasville, KY (US)

(73) Assignee: International Business Machines Corporation, Armonk, NY (US)

( * ) Notice: Subject to any disclaimer, the term of this patent is extended or adjusted under 35 U.S.C. 154(b) by 1207 days.

(21) Appl. No.: 11/931,082

(22) Filed: Oct. 31, 2007

(65) Prior Publication Data
US 2009/0113277 A1 Apr. 30, 2009

(51) Int. Cl.
*G06F 17/00* (2006.01)
(52) U.S. Cl. .................... 715/273; 715/234
(58) Field of Classification Search .............. 715/236, 715/273, 205, 200, 234, 235
See application file for complete search history.

(56) References Cited

U.S. PATENT DOCUMENTS

| | | | |
|---|---|---|---|
| 7,519,720 B2* | 4/2009 | Fishman et al. | 709/230 |
| 7,657,844 B2* | 2/2010 | Gibson et al. | 715/827 |
| 2004/0218451 A1* | 11/2004 | Said et al. | 365/222 |
| 2005/0246653 A1* | 11/2005 | Gibson et al. | 715/773 |
| 2007/0028178 A1* | 2/2007 | Gibson et al. | 715/760 |
| 2009/0070413 A1* | 3/2009 | Priyadarshan et al. | 709/203 |

OTHER PUBLICATIONS

Becky Gibson, Dojo-accessibility proposal for dealing with high contrast, Jul. 12, 2006, pp. 1-4.*
"Widgets and High Contrast Mode", *The Dojo Toolkit*, http://dojotoolkit.org/node/580 (Retrieved Nov. 7, 2007), (Mar. 30, 2007).

* cited by examiner

*Primary Examiner* — Manglesh M Patel
(74) *Attorney, Agent, or Firm* — DeLizio Gilliam, PLLC

(57) ABSTRACT

Described herein are processes and devices that determine a high contrast setting on a client. One of the devices described is a high contrast mode detector. The high contrast mode detector creates an object in a web document and assigns a pre-determined value to a displayable property of the object. The predetermined value is different than a high contrast value that the client would use to display the web document object if a high contrast setting is enabled. The high contrast mode detector associates the object with the web document. The client generates a computed value used to display the object. If high contrast mode is enabled, the client applies the high contrast value as the computed value, otherwise the client applies the pre-determined value. The high contrast mode detector compares the pre-determined value to the computed value and detects the high contrast setting based on the comparison result.

12 Claims, 5 Drawing Sheets

DETERMINING A HIGH CONTRAST DISPLAY SETTING ON A CLIENT DEVICE TO PROCESS A WEB DOCUMENT

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2007, International Business Machines Corporation.

BACKGROUND

1. Technical Field

Embodiments of the inventive subject matter relate generally to internet related systems, and more particularly to determining a high contrast display setting on a client device.

2. Background Art

Client devices can process web documents, like web pages, to display content from the Internet. Web pages often include, as part of the design code, stylistic elements that display how a web page looks within a web browser interface. However, those stylistic elements can be over ridden by a mode on the client device's operating system called "high contrast mode." High contrast mode is included on a client device so that users can adjust a view on the client device to use highly contrasting colors. When high contrast mode is enabled, however, web pages with stylistic elements can look very different than they were designed. For instance, when a client device has high contrast mode enabled, images and colors from cascading style sheets do not load into the web page.

SUMMARY

Described herein are processes and devices that determine a high contrast setting on a client. One of the devices described is a high contrast mode detector. The high contrast mode detector creates an object in a web document and assigns a pre-determined value to a displayable property of the object. The pre-determined value is different than a high contrast value that the client would use to display the web document object if a high contrast setting is enabled. The high contrast mode detector associates the object with the web document. The client generates a computed value used to display the object. If high contrast mode is enabled, the client applies the high contrast value as the computed value; otherwise the client applies the pre-determined value. The high contrast mode detector compares the pre-determined value to the computed value and detects the high contrast setting based on the comparison result.

BRIEF DESCRIPTION OF THE DRAWING(S)

The present embodiments may be better understood, and numerous objects, features, and advantages made apparent to those skilled in the art by referencing the accompanying drawings.

DESCRIPTION OF ILLUSTRATIVE EMBODIMENTS

The description that follows includes exemplary systems, methods, techniques, instruction sequences and computer program products that embody techniques of embodiments of the invention(s). However, it is understood that the described embodiments of the invention(s) may be practiced without these specific details. For instance, although examples refer to JavaScript, other examples may utilize other client-side scripting languages, like JScript, VBScript, ActionScript, etc., server-side languages and scripts, such as PHP, ASP, etc., and other codes like XML, AJAX, C#, Visual Basic, etc. In other instances, well-known instruction instances, protocols, structures and techniques have not been shown in detail in order not to obfuscate the description.

Introduction

Client devices can process web documents, like web pages, to display content from the Internet. Web pages often include, as part of the design code, stylistic elements that display how a web page looks within a web browser interface. For instance, some web designers create web page documents that utilize cascading style sheets (CSS). CSS can display text and colors on a web page in a way that easily loads into stylistic elements of the web page, such as Hypertext Markup Language (HTML) elements. A CSS can be used to create a consistent theme for a web site, for example by inserting background images into already existing HTML elements. For this reason, many developers use CSS background colors and images in a theme rather than using actual HTML image elements.

Figure 1:
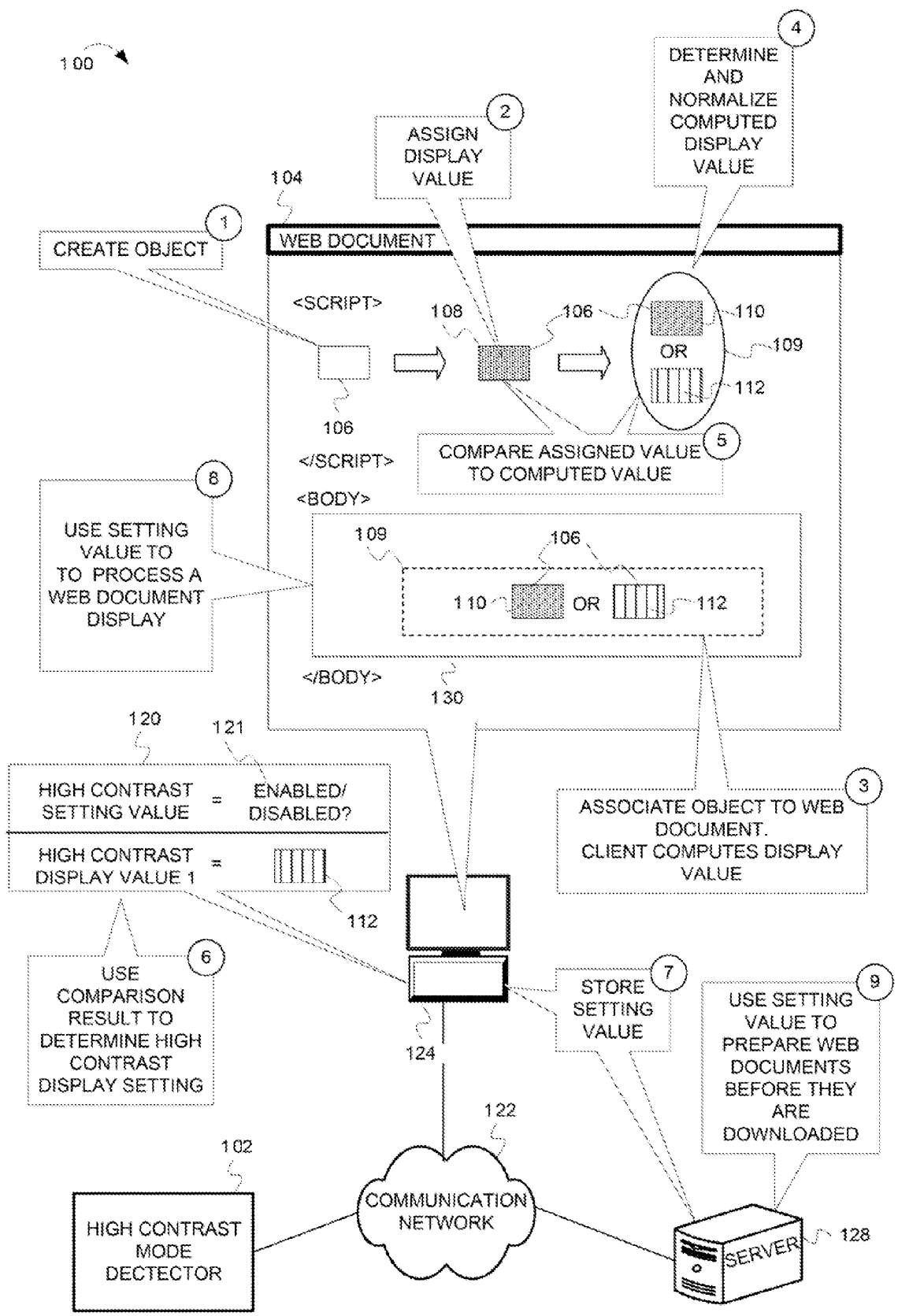
FIG. 1 is an illustration of an example high contrast mode detector 102 within an operating environment 100.

However, those stylistic elements (e.g., CSS) can be overridden by a mode on the client device's operating system called "high contrast mode". High contrast mode is included on a client device so that users can adjust a view on the client device to use highly contrasting colors. However, when high contrast mode is enabled, web pages that utilize some stylistic elements, like CSS, can look very different than they were designed. For instance, when a client device has high contrast mode enabled, images and colors from CSS do not load into a web page. Therefore, to ensure that a web page appears clear and readable, it is can be useful to know when high-contrast mode is enabled on a client device. FIG. 1 shows one example of how a high contrast mode detector can detect a high contrast setting on a client device ("client").

Example Operating Environments

This section describes example operating environments and presents structural aspects of some embodiments.

FIG. 1 is an illustration of an example high contrast mode detector 102 within an operating environment 100. In FIG. 1, the high contrast mode detector 102 is connected to a communication network 122. Also connected to the communication network 122 is a client 124 configured to download and process web documents. A server 128 is also connected to the communication network 122. In FIG. 1, the server 128 hosts a web site comprising one or more web documents, such as web document 104. The client 124 may download one or more instances of the web document 104 provided by the server 128. Instances of the web document 104 are also referred to as the web document 104. The high contrast mode detector 102 and the client 124 together process the web document 104. Various parts of the client 124 may assist in processing the web document 104, such as software applications, hardware or settings on the client 124. However, for brevity, instead of trying to identify whether an application on the client 124, a hardware resource on the client 124, or a setting on the client 124 processes the web document 104, the description herein will describe operations as being performed, generically by the client 124.

The high contrast mode detector 102, in stage "1", creates an object 106 within the web document 104. For example, the high contrast mode detector 102 creates the object 106 via one or more instructions or instructions sequences (i.e., code), in the web document 104. The one or more instructions can be subroutines, functions, methods, variables, etc. in a client-side script written in JavaScript. The high contrast mode detector 102 can create the object 106 according to the Document Object Model (DOM) (e.g., by using the "document.createElement" method). The DOM is a way the JavaScript can see the web document 104 and the state of applications and resources of the client 124 as the client 124 processes the web document 104. In other embodiments, the high contrast mode detector 102 may utilize other languages, such as XML, and other models, such as the Simple API for XML (SAX) model.

The high contrast mode detector 102, in stage "2", assigns a display value 108 to a displayable property of the object 106. The displayable property is a property that a high contrast mode would affect when the object 106 is displayed in the web document 104, or any other associated web documents (not shown). Some examples of displayable properties that would be affected by a high contrast mode include style properties such as a "color" style property or an "image" style property. For example, the high contrast mode detector 102 assigns a known foreground color value to the object 106 (e.g., "element.style.color=assigned_color_value"). The assigned color value should be a value that is not likely to be used in a high contrast mode setting 120, such as a low contrast color (e.g., pale and pastel colors).

The high contrast mode detector 102, in stage "3", associates the object 106 with the web document, causing the object 106 to be displayed on the client 124. The client 124 generates, or computes, a displayed value ("computed display value") 109. For example, the high contrast mode detector 102 adds, or associates, the object 106 to a displayable portion (e.g., the body) of the web document 104 (e.g., "document.body.addChild(element)"). As the web document 104 loads, the client 124 processes the displayable portion of the web document 104, including the object 106. When the high contrast mode detector 102 displays the web document 104 on the client 124, the client 124 generates the computed display value 109 for the object 106. The high contrast mode detector 102 can utilize code that prevents the object from being visibly seen on the client 124. In FIG. 1, the computed display value 109 is shown as one of two different values 110, or 112. When high contrast mode is disabled on the client 124, the client 124 applies the assigned display value 108 to the object 106, resulting in the first computed display value 110, which is the same value as the assigned display value 108. On the other hand, when high contrast mode is enabled on the client 124, the client 124 does not successfully apply the assigned display value 108. Instead, the client 124 applies a high contrast display value 112. The high contrast display value 112 is different from the assigned display value 108 because the assigned display value 108 is a non-high-contrast value.

The high contrast mode detector 102, in stage "4", determines and normalizes the computed display value 109. For example, the high contrast mode detector 102 can determine the computed display value 109 by using specific instructions (e.g., the "getComputedStyle" method, "getPropertyValue ("color")" method, currentStyle object, etc.). The high contrast mode detector 102 stores the determined computed value 109 in a variable (e.g., computed_color_value=cStyle.getPropertyValue("color"), or computed_color_value=div.currentStyle.color). The high contrast mode detector 102 can perform any necessary clean-up, or normalization, operations to ensure that the computed display value 109 is in a comparable format to the assigned display value 108. For instance, the client 124 can return the computed display value 109 with extra spaces. Therefore, the high contrast mode detector 102 can remove spaces from the computed display value 109 (e.g., computed_color_value=computed_color_value.replace (//g,"")/ In another instance, the client 124 could return the computed display value 109 in a hexadecimal format, but the assigned display value 108 may be in RBG color format. Thus, the high contrast mode detector 102 can convert the computed display value 109 from hexadecimal color format to RGB color format (e.g., RCB color format).

In stage "5" the high contrast mode detector 102 compares the computed display value 109 to the assigned display value 108. The assigned value 108, for example, was stored in a variable (e.g., assigned_color_value) in stage "2". The assigned value 108, therefore, is stored and ready for use as a first comparison value. The computed value 109 was also stored in a variable in stage "4", and so is also ready for use as a second comparison value. Consequently, the two values are stored in variables so that they call be compared. The high contrast mode detector 102 uses a function or expression in the web document 104 to compare the two comparison values, or variables, (e.g., if (computed_color_value!=assigned_color_value)).

In stage "6" the high contrast mode detector 102 uses the comparison result from stage "5 to determine a high contrast setting value 121 that indicates whether the client device is enabled to apply high contrast values. The high contrast setting value 121 can be either "enabled" or "disabled" (i.e., on or off). Thus, the high contrast setting value 121 may also be referred to as an "enablement" value. For example, the high contrast mode detector 102 can determine that the assigned display value 108 is not different from the computed display value 109. Thus, the high contrast mode detector 102 determines that a high contrast setting value 121 is set to "disabled", or in other words the high contrast setting 120 is enabled on the client 124. Thus, the client 124 is in "high contrast mode".

The high contrast mode detector 102, in stage "7", stores the determined result indicating the high contrast setting value 121. This stage can occur in parallel with stage "5". For example, the high contrast mode detector 102 stores the determined result in a global variable as a result of a comparison expression (e.g., if (computed_color_value?= assigned_color_value), is HighContrast=true).

The high contrast mode detector 102, in stage "8", uses the determined result (e.g., isHighContrast=true), to process the web document 104, for example, to determine instructions that will properly display the web document 104, or any other associated web documents or web pages (not shown). For example, if the high contrast setting 120 is enabled, then the high contrast mode detector 102 knows that CSS background images and colors will be over ridden by the enabled high contrast mode. Hence the high contrast mode detector 102 can load a set of "real" image files into a memory cache on the client 124 to be used in the body 130 of the web document 104, or any other web document or web page (not shown). For instance, when a web developer creates scripting components using CSS background images, the developer can create alternate code in the web document 104 to compensate for the lack of CSS background images. The alternate code can download and use the set of "real" images on the body 130 rather than the CSS background images. The high contrast mode detector 102 can select the alternate code.

Further, in stage "9", the high contrast mode detector 102, uses the global variable to prepare web documents (e.g., web pages), scripts, downloads, etc., before they are downloaded to the client 124. For example, the high contrast mode detector 102 can download and pre-cache images to the client device knowing that the client 124 is in high contrast mode in anticipation of processing web documents on the client 124.

Example High Contrast Mode Detector Architecture

Figure 2:
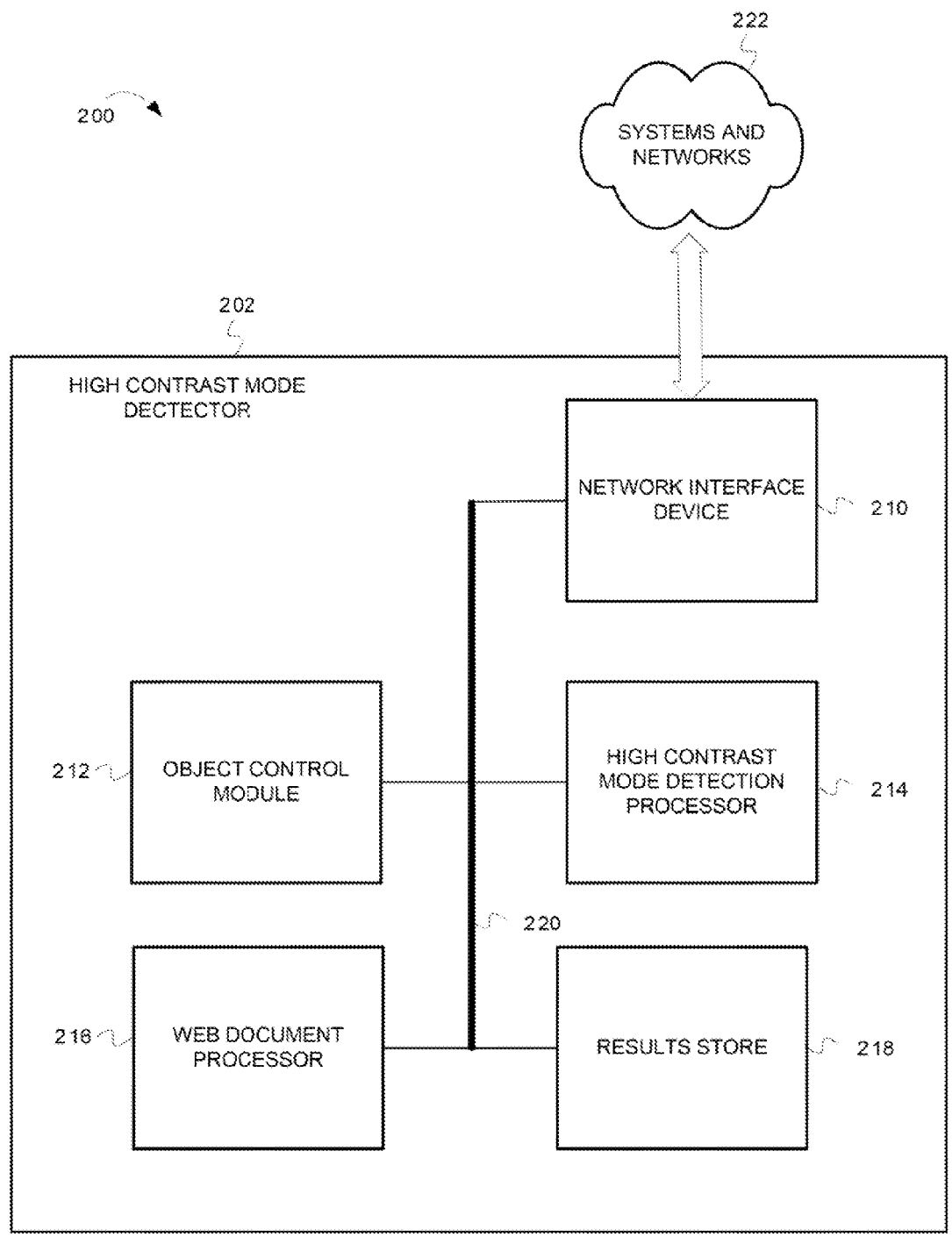
FIG. 2 is an illustration of an example high contrast mode detector architecture 200.

FIG. 2 is an illustration of an example high contrast mode detector architecture 200. In FIG. 2, the high contrast mode detector architecture 200 includes a high contrast mode detector 202 configured to connect to systems and networks 222.

The high contrast mode detector architecture 200 also includes a network interface device 210 configured to connect to, and communicate with, the systems and networks 222. The network interface device 210 can access web documents and other similar files. The network interface device 210 can connect to other network devices, like routers, servers and client devices connected to the systems and networks 222.

The high contrast mode detector architecture 200 also includes an object control module 212 configured to create objects, assign display values to objects, and add objects to web documents.

The high contrast mode detector architecture 200 also includes a high contrast mode detection processor 214 configured to determine a high contrast display setting, or mode, on a client device. The high contrast mode detection processor 214 can process instructions, set variables, compare values, load information, etc. For example, the high contrast mode detection processor 214 can execute instructions that display a web document object on a client, obtain a computed display value assigned by the client, and compare the computed display value to an assigned display value.

The high contrast mode detector architecture 200 also includes a web document processor 216 configured to process instructions contained within web documents, such as web pages, including scripts (e.g., JavaScript, ActionScript, etc.), markup languages (e.g., hypertext markup language or "HTML", extensive markup language or "XML", etc.), database communication statements (e.g., connection strings, data sets, etc.), and dynamic web code (e.g., Dynamic HTML, Flash, etc.). The web document processor 216 can provide data, instructions, or other information to the high contrast mode detection processor 214. Likewise, the web document processor 216 is configured to process a web document based on a high contrast display setting determined by the high contrast mode detection processor 214.

The high contrast mode detector architecture 200 also includes a results store 218 configured to store results of comparisons and operations performed by the high contrast mode detection processor 214 and/or the web document processor 216. For example, the results store 218 can comprise memory to store a variable generated by the high contrast mode detection processor 214 that can be used globally, for example, by the web document processor 216, to process web documents on a client device.

The high contrast mode detector architecture 200 also includes a communication interface 220 configured to facilitate communication between the components of the high contrast mode detector 202.

Each component shown in the high contrast mode detector architecture 200 is shown as a separate and distinct element. However, some functions performed by one component could be performed by other components. For example, the high contrast mode detection processor 214 could also process web documents. Furthermore, the components shown may all be contained in the high contrast mode detector 202, but some, or all, may be included in, or performed by, other devices on the systems and networks 222. Furthermore, the high contrast mode detector architecture 200 can be implemented as software, hardware, any combination thereof, or other forms of embodiments not listed.

Example Operations

This section describes operations associated with some embodiments of the invention. In the discussion below, some flow diagrams are described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). Moreover, some embodiments can perform less than all the operations shown in any flow diagram.

Figure 3:
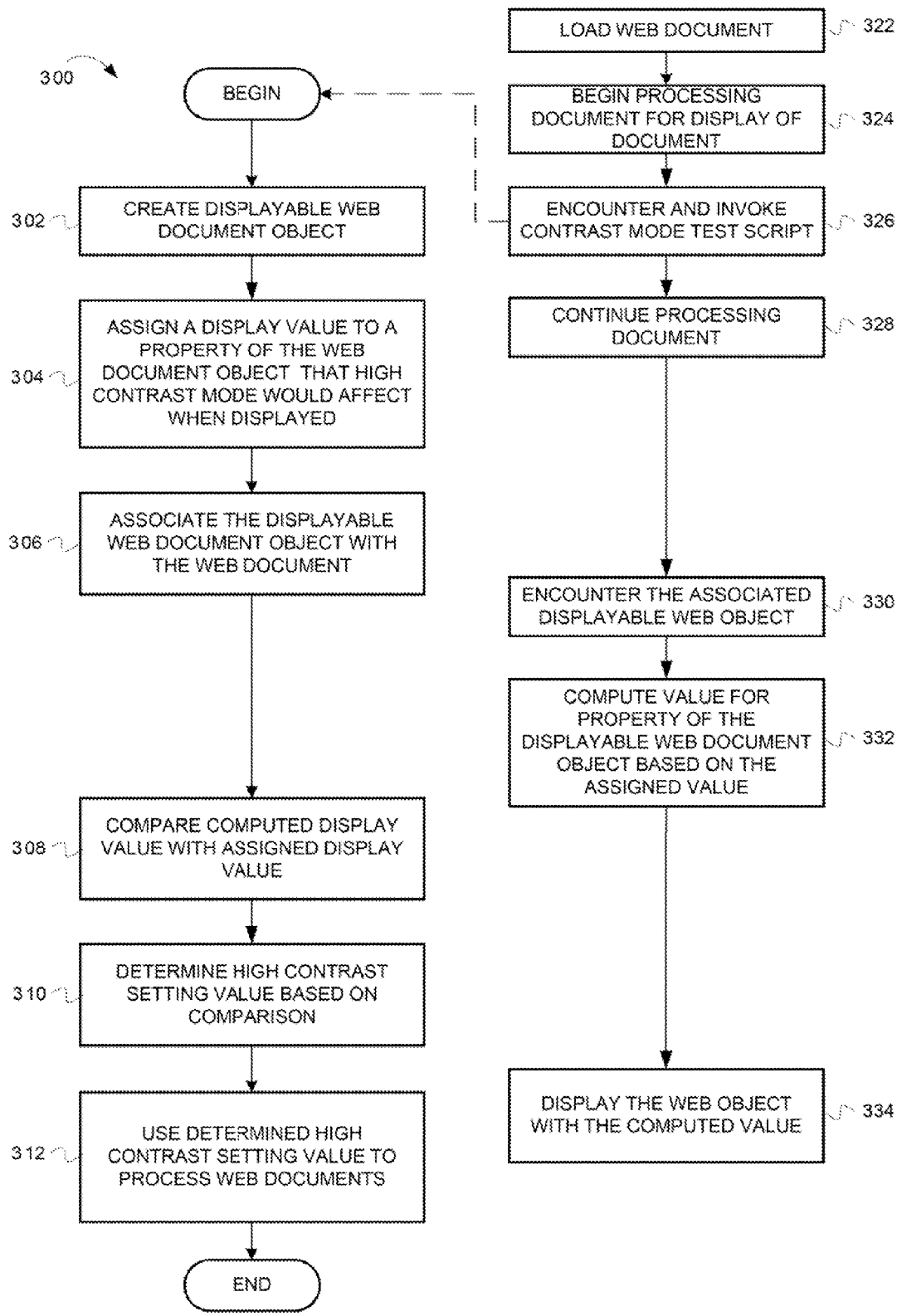
FIG. 3 is an example flow diagram 300 illustrating determining a high contrast setting on a client device to process a web document.

FIG. 3 is an example flow diagram illustrating determining a high contrast setting on a client device ("client") to process a web document. In FIG. 3, two processes occur in parallel. The processing blocks 322 through 334, on the right of FIG. 3, are performed by an application on a client device ("client"). The processing blocks 302 through 312 are performed by a high contrast mode detector. The flow 300 begins at processing block 322, where a client application loads a web document. The client application is an application that can process and display web document objects and code, such as a web browser. The client application can load the web document in response to a manual or automated request to access the web document locally, or to download an instance of the web document from a server or another networked device.

The flow 300 continues at processing block 324, where the client application begins processing the web document for display. The client application includes parsing components or modules that process code within the document. In a web document, there are portions that are processed before displaying any content within the application display interface. Those portions include the header of the web document. In the header, the web document may include scripts or references to scripts, such as a client-side script written in JavaScript. The client application then processes the displayable portions of the web document, such as the body of the web document. In the body, for example, the code can call to a script in the header.

The flow 300 continues at processing block 326, where the client encounters and invokes a script used to determine a high contrast setting from within the web document. The client could encounter a call to the script from within the body or the web document that invokes a script function. The client application can continue processing the web document at processing block 328 while the high contrast mode detector begins processing the web document at processing block 302.

The flow 300 continues at processing block 302, where a high contrast mode detector creates a displayable web document object. In one example, the high contrast mode detector utilizes a client-side script to create the object. The client-side script could be included within the header section of the web document, or called from a script found in a separate web document. In one example, the script is written in JavaScript. The high contrast mode detector uses a method in the script to create an object (e.g., document.createElement) when the web document loads into the client application.

The flow 300 continues at processing block 304, where the high contrast mode detector assigns a display value to the web document object for a property that a high contrast mode would affect when the object is displayed. For instance, the high contrast mode detector creates an object to insert into the web document. The object will subsequently be inserted into a section of the web document that will respond to the high contrast setting on the client. The object comprises a property type that a high contrast mode on a client application would affect when the object is displayed, for instance, when the web document is loaded into a web browser on the client. Some examples of properties that a high contrast mode would affect include color and image style properties.

In one example, the high contrast mode detector utilizes the client-side script to assign a display valve to the web document object. The high contrast mode detector applies the property to the object such as a color property. The high contrast mode detector also assigns a display value to the object, such as a color value, (e.g., "element.style.color=assigned_color_value"). The assigned color value is a pre-determined value that would not likely be used in a high contrast mode color scheme on a client. Some example assigned color values may include low contrast colors, like pale or pastel colors shades that would not highly contrast well with a color opposite. A specific example of such a color value is rgb(153,204,204), which is a shade of blue gray.

The flow 300 continues at processing block 306, where the high contrast mode detector associates the web document object with the web document. For example, the high contrast mode detector adds, or associates, the object to a displayable portion (e.g., the body), of the web document using a method, e.g., "document.body.addChild(element)". This example method is consistent with the DOM, which allows a high contrast mode detector, and any scripts it is utilizing, to see the state of the web document and process scripts dynamically within the web document.

The flow 300 continues at processing block 330, where the client application then encounters the web document object. Because the high contrast mode detector associated the object with the web document, the client recognizes the association and incorporates the object, and its properties, into the displayable portion of the web document.

The flow continues at processing block 332, where the client application computes a display value ("computed display value") for the property of the displayable web document object based on the assigned value. As the web document loads, the client application processes the body of the web document and, as the object begins to display within the client application, the client application attempts to apply the assigned display value to the object. If high contrast mode is not enabled on the client, then the client application successfully applies the assigned color value, resulting in a computed display value having the same value as the assigned display value. For instance, without high contrast mode intervention, the client application could apply an assigned color value to the object, resulting in the computed display value having the assigned color value The computed display value would, consequently, be the same value as the assigned color value. However, if high contrast mode is enabled on the client, then the client application does not successfully apply the assigned display value to the object, but rather the client application applies a high contrast setting value, such as a high contrast color value, to the object. Thus, the result is a computed display value that has a color value that is different from the assigned display value. The computed display value has a different color value than the color of the assigned display value because the assigned display value was assigned to be a low-contrast color, unlikely to be used by the high contrast mode. The computed color value could be different in both color value and format. For example, if the assigned color value is set to a red/green/blue (RGB) color code format, with a value of rgb(153,204,204), the high contrast mode may return a different color value in a hexadecimal format, for example, #010 101, which represents the color black in a six-digit hexadecimal color code format. On the other hand, in the case where the high contrast setting is disabled, then the high contrast setting will not affect the computed display value. Consequently, the high contrast mode detector, in response to the web document loading, generates a computed color value that has an equivalent color value and format as the assigned color value.

The flow 300 continues at processing block 308, where the high contrast mode detector compares the computed display value to the assigned display value. The assigned value, for example, was stored in a variable (e.g., assigned_color_value) at processing block 304. The assigned value, therefore, is stored and ready for use as a first comparison value. The high contrast mode detector determines the computed display value and stores the value in a variable (e.g., computed_color_value=cStyle.getPropertyValue("color"), or computed_color_value=div.currentStyle.color). The high contrast mode detector can perform any necessary clean-up, or normalization, operations to ensure that the computed display value is in a comparable format to the assigned display value. For instance, the client can return the computed display value with extra spaces. Therefore, the high contrast mode detector removes spaces from the computed display value (e.g., computed_color_value= computed_color_value.replace(//g,"")). In another instance, the client could return the computed display value in a hexadecimal format, but the assigned display value may be in RBG color format. Thus, the high contrast mode detector converts the computed display value from hexadecimal color format to color format (e.g., RGB color format). Thus, the computed value also ready for use as a second comparison value. Consequently, the two values are stored in variables so that they can be compared. The high contrast mode detector uses a function or expression in the web document 104 to compare the two comparison values, or variables, (e.g., if (computed_color_value!=assigned_color_value))

The flow 300 continues at processing block 310, where the high contrast mode detector determines the high contrast setting value based on the comparison. For instance, the high contrast mode detector compares the computed display value with the assigned display value as part of a conditional statement that returns a result. The result indicates whether the high contrast setting on the client is enabled or disabled. If the values are different, such as different in color value or format value, then the result of the conditional statement is that the high contrast setting is enabled on the client (e.g., rgb(153, 204,204)≠#010101,→isHighContrast=true). On the other hand, if values are equivalent then the result of the conditional statement is that the high contrast setting is disabled on the client (e.g., rgb(153,204,204)=rgb(153,204,204),→ isHighContrast=false).

The following is an embodiment of a JavaScript function that the high contrast mode detector can use to perform operations described in conjunction with processing block 302:

```
function testHighContrast( ) {
    var assigned_color_value = "rgb(153,204,204)";
    var isHighContrast = false;
    var div = document.createElement("div");
    div.style.color=assigned_color_value;
    document.body.appendChild(div);
    var computed_color_value = null;
    if (window.getComputedStyle) {
        var cStyle = getComputedStyle(div, "");
        computed_color_value = cStyle.getPropertyValue("color");
    }else{
        computed_color_value = div.currentStyle.color;
    }
    if(curColor != null){
        computed_color_value = computed_color_value.replace(/ /g,"");
        if (computed_color_value != assigned_color_value){
            isHighContrast = true;
        }
    }
    document.body.removeChild(div); //optional remove for efficiency
    return isHighContrast;
}
```

This function could be called at the start of a web document page load function or event.

The processing blocks 302, 304, 306, 308 and 310 have described one technique for determining a high contrast setting on a client. Specifically, a technique was described that assigned a color value to an object on a web document. However, other embodiments may utilize other techniques, such as assigning an image value instead of a color value. For instance, when using an image value, the high contrast mode detector could still perform similar operations described above to generate and use an object in a web document. Likewise, the high contrast mode detector could still apply a style property to the object, but instead of applying a color style and assigning a color value to the object, the high contrast mode detector could apply an image style and assign an image value to the object. Specifically, the high contrast mode detector could assign an image's file name (e.g., test.gif), to the object. The image name is a pre-determined value. It can be useful to use a small image file to expedite any loading of the file onto the client.

The high contrast mode detector associates the object with the web document. The web document loads in the client application and the client application generates a computed display value. The high contrast mode detector call then compare the computed display value to the assigned display value. When high contrast mode is enabled, in response to loading the web document, the high contrast setting will generate a computed display value that is different from the assigned display value. For example, in some web browser applications, upon loading the web document into the web browser application, the client device will interact with the high contrast setting to compute an image display value of a single-word, specifically the word "none". Consequently, the high contrast mode detector compares the assigned display value (e.g., assigned image file name), to the computed image display value to determine a high contrast setting value. For a high contrast setting that is enabled the compared values will be different (e.g., "test.gif"≠"none",→isHighContrast=true). For a high contrast setting that is disabled, the compared values will be the same (e.g., "test.gif"="test.gif",→ isHighContrast=false).

The flow continues at processing block 334, where the client application displays the web object with the computed value. In some instances, the high contrast mode detector can assign a value to the object so that it does not visibly appear on the client. Further, because the high contrast mode detector has determined what the high contrast mode setting is on the client, the high contrast mode detector can affect how portions of the web document, including the object, are processed based on the high contrast setting.

The flow 300 continues at processing block 312, where the high contrast mode detector uses the determined high contrast setting value to process web documents. For instance, the high contrast mode detector can store the high contrast setting value in temporary memory, or in a global variable. The high contrast mode detector can communicate the global variable to a server. The high contrast mode detector can also use the high contrast setting value, or global variable, to determine instructions that will properly display the web document, or any associated web document or web page. For example, if high contrast mode is enabled, CSS colors and background images will not display in a web document body. In some situations, the CSS colors and background images may have been designed to display meaningful content or accessibility options on the web document. As a result, if the CSS colors and background images do not display, then the web document content may not display the meaningful content properly. However, since the high contrast mode detector knows the high contrast setting value, so the high contrast mode detector can select instructions, possibly embedded into the web document or communicated by the server, that will load a set of "real" image files, like JPEGs or GIFs files, into a memory cache on the client to be used in place of CSS background images. For instance, when a web developer creates scripting components using CSS background images, the developer can create alternate code in the web document to compensate for the lack of CSS, such as, including code that will download and use the set of real images files on the body rather than the CSS background images. The high contrast mode detector can select the alternate code. Alternatively, instead of using real image files, a web developer may create an alternate CSS that doesn't rely on background images or colors to display meaningful content when the high contrast setting is enabled. Consequently, the high contrast mode detector could instead select the alternate CSS. Consequently, the high contrast mode detector makes the web document fully accessible and readable based on the high contrast setting value.

Further, the high contrast mode detector may use the global variable on the server to prepare web documents, web pages, scripts, downloads, etc., before they are downloaded to the client. For example, the high contrast mode detector, knowing that high contrast mode is enabled on a client, can download and pre-cache images to the client in anticipation of processing web pages on the client.

The following is an embodiment of a JavaScript function that the high contrast mode detector can use to perform operations described in conjunction with processing block 12:

```
<script>
var makeAccessible = testHighContrast( );
function createCheckbox(checkboxId){
    var check = null;
    if (makeAccessible == true){
        check = document.createElement("input");
        check.id = checkboxId;
        check.checked = true;
        // additional code to create HTML checkbox
    } else {
        // create fancy button using background images
        check = document.createElement("span");
        check.id=checkboxId;
        check.style.background-image="checkboxChecked.gif";
        // additional code to create fancy checkbox using
        background images.
    }
    return check;
}
</script>
```

Example Systems and Networks

This section describes example systems and networks and presents structural aspects of some embodiments.

Example High Contrast Mode Detector Network

Figure 4:
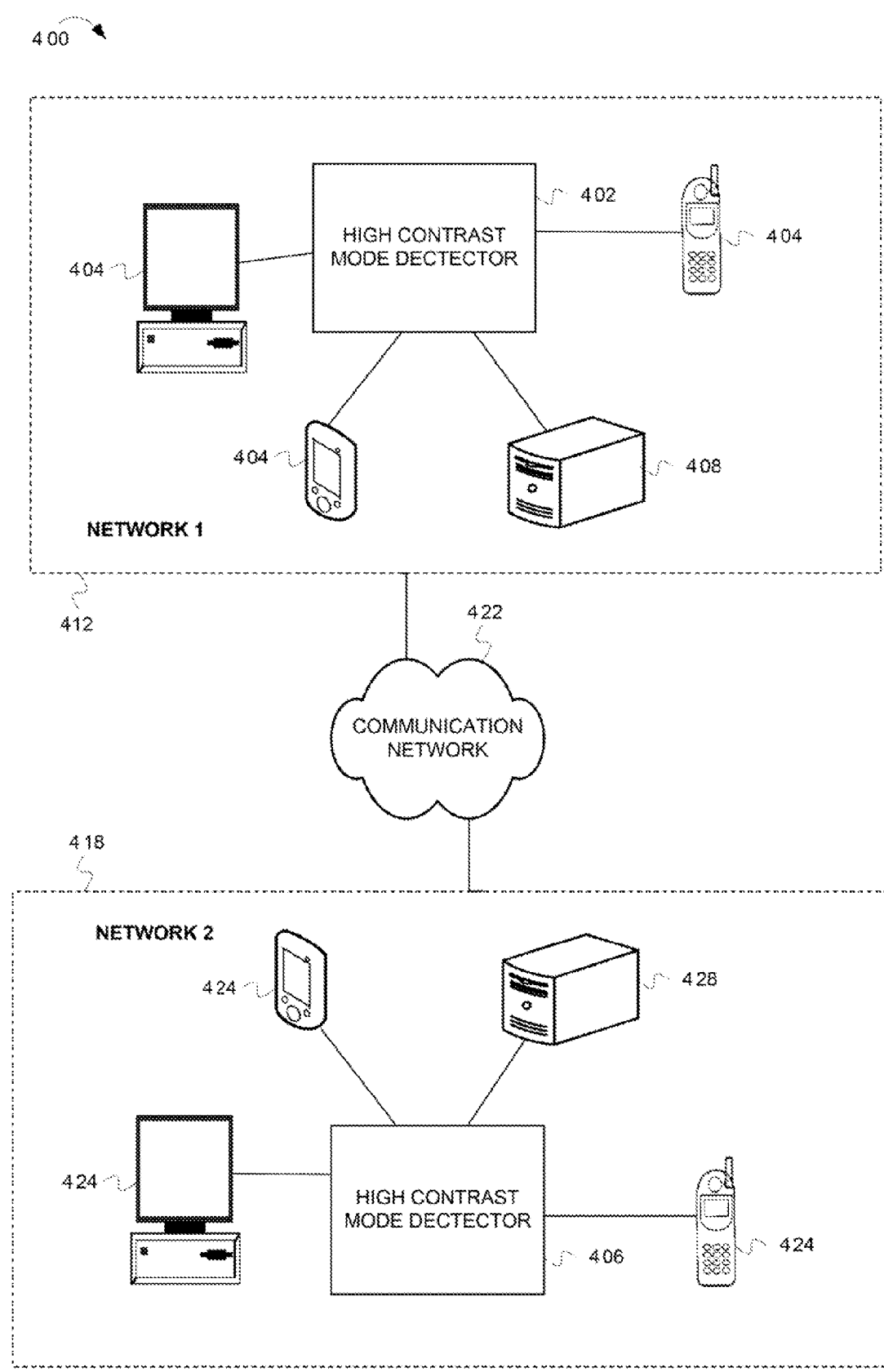
FIG. 4 is an illustration of an example high contrast mode detector 402 on a network 400.

FIG. 4 is an illustration of a high contrast mode detector 402 on a network 400. In FIG. 4, the network 400, also referred to as a high contrast mode detector network 400, includes a first local network 412 that includes network devices 404 and 408 that can use the high contrast mode detector 402. Example network devices 404 and 408 include personal computers, personal digital assistants, mobile telephones, mainframes, minicomputers, laptops, servers, or the like. In FIG. 4, some network devices 404 can be client devices ("clients") that can work in conjunction with a server device 408 ("server"). Any one of the network clients 404 and server 408 can be embodied as the computer system described in FIG. 5. A communications network 422 connects a second local network 418 to the first local network 412. The second local network 418 also includes client 424 and a server 428 that can use a high contrast mode detector 406.

Still referring to FIG. 4, the communications network 412 can be a local area network (LAN) or a wide area network (WAN). The communications network 412 includes any suitable technology, such as Public Switched Telephone Network (PSTN) not be standalone devices. For example, the high contrast mode detector 402 may be distributed across multiple machines, perhaps including the server 408. The high contrast mode detector 402 may be embodied as hardware, software, or a combination of hardware and software in a server, such as the server 408. One or both of the high contrast mode detectors 402 and 406 may also be embodied in one or more client machines, possibly including one or more of the clients 404 and 424. For instance, servers 408, 428 can embody functionality (e.g., as code, a processing card, etc.) that receive global variables with a determined high contrast setting, and use the global variable to process web documents to display on one of the clients 404, 424. Functionality for processing web documents can be embodied in one or more server machines or distributed as tasks to client machines accessing the virtual universe. For example, determining high contrast settings may be performed as a background task on client machines distributed by servers.

Example High Contrast Mode Detector Computer System

Figure 5:
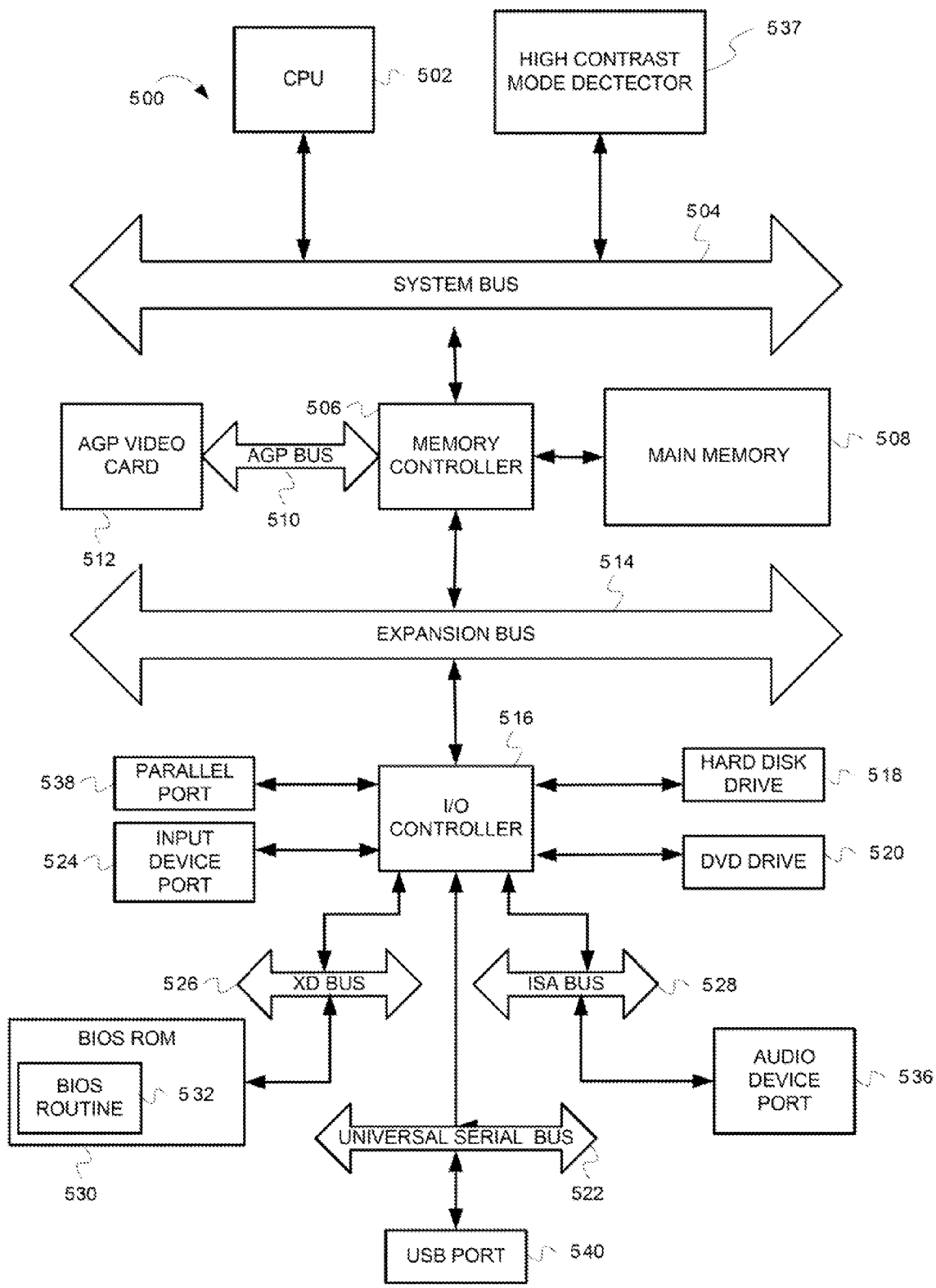
FIG. 5 is an illustration of an example high contrast mode detector computer system 500.

FIG. 5 is an illustration of a high contrast mode detector computer system 500. In FIG. 5, the high contrast mode detector 500 ("computer system") includes a CPU 502 connected to a system bus 504. The system bus 504 is connected to a memory controller 506 (also called a north bridge), which is connected to a main memory unit 508, AGP bus 510 and AGP video card 512. The main memory unit 508 includes any suitable memory random access memory (RAM), such as synchronous dynamic RAM, extended data output RAM, etc.

In one embodiment, the computer system 500 includes a high contrast mode detector 537. The high contrast mode detector 537 can process communications, commands, or other information, to detect a high contrast setting on a client device to process a web page. The high contrast mode detector 537 is shown connected to the system bus 504, however the high contrast mode detector 537 could be connected to a different bus or device within the computer system 500. The high contrast mode detector 537 includes software modules that utilize main memory 508. For instance, the high contrast mode detector 537 can wholly or partially be embodied as a program product in the main memory 508. The high contrast mode detector 537 can be embodied as logic in the CPU 502 and/or a co-processor, one of multiple cores in the CPU 502, etc.

An expansion bus 514 connects the memory controller 506 to an input/output (I/O) controller 516 (also called a south bridge). According to embodiments, the expansion bus 514 can be include a peripheral component interconnect (PCI) bus, PCIX bus, PIC Card bus, CardBus bus, InfiniBand bus, or an industry standard architecture (ISA) bus, etc.

The I/O controller is connected to a hard disk drive (HDD) 518, digital versatile disk (DVD) 520, input device ports 524 (e.g., keyboard port, mouse port, and joystick port), parallel port 538, and a universal serial bus (USB) 522. The USB 522 is connected to a USB port 540. The I/O controller 516 is also connected to an XD bus 526 and an ISA bus 528. The ISA bus 528 is connected to an audio device port 536, while the XD bus 526 is connected to BIOS read only memory (ROM) 530.

In some embodiments, the computer system 500 includes additional peripheral devices and/or more than one of each component shown in FIG. 5. For example, in some embodiments, the computer system 500 includes multiple external multiple CPUs 502. In some embodiments, any of the components can be integrated or subdivided.

Any component of the computer system 500 can be implemented as hardware, firmware, and/or machine-readable media including instructions for performing the operations described herein.

The described embodiments may be provided as a computer program product, or software, that may include a machine-readable medium having stored thereon instructions, which may be used to program a computer system (or other electronic device(s)) to perform a process according to embodiments of the invention(s), whether presently described or not, because every conceivable variation is not enumerated herein. A machine readable medium includes any mechanism for storing ( "machine-readable storage medium")or transmitting ("machine-readable signal medium") information in a form (e.g., software, processing application) readable by a machine (e.g., a computer). A machine-readable storage medium may include, but is not limited to, magnetic storage medium (e.g., floppy diskette); optical storage medium (e.g., CD-ROM); magneto-optical storage medium; read only memory (ROM); random access memory (SIAM);

erasable programmable memory (e.g., EPROM and EEPROM); flash memory; or other types of medium suitable for storing electronic instructions in a form that is not propagated signal. A machine readable signal medium may include embodiments in an electrical, optical, acoustical or other form of propagated signal (e.g., carrier waves, infrared signals, digital signals, etc.).

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. For example, although examples refer to comparing an object's color value, other examples could compare other values, like a color format, or an image file name. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method comprising:
   creating a web document object;
   assigning a first color value to a displayable property of the web document object, wherein the displayable property of the web document object comprises a color, the first color value being pre-determined to be different than a second color value that a client device would use to display the web document object on the client device when the client device is in a high contrast mode, said second value being a default high contrast value stored on the client device;
   associating the web document object with a web document, wherein said associating causes the client device to generate a computed color value to use for display of the web document object in the web document, wherein the client device generates the computed color value as the first color value when the client device is not in high contrast mode and wherein the client device generates the computed color value as the second color value when the client device is in high contrast mode;
   comparing the first color value to the computed color value of the web document object to determine whether the client device is in high contrast mode;
   indicating that the client device is in high contrast mode if the first color value and the computed color value are different according to said comparing;
   indicating that the client device is not in high contrast mode if the first color value and the computed color value are not different according to said comparing;
   producing a result based, at least in part, on said comparing the first color value to the computed color value of the web document object, wherein the result indicates whether the client device is in high contrast mode;
   storing the result in a variable; and
   sending the variable to a server to process additional web documents, using the variable, before the additional web documents are loaded onto the client device.

2. The method of claim 1, wherein said creating the web document object, said assigning the first color value, said associating the web document object with the web document, said comparing the first color value to the computed color value, and said indicating the high contrast setting comprises using one or more instructions in the web document.

3. The method of claim 1, wherein the one or more instructions comprise JavaScript.

4. The method of claim 1 further comprising:
   processing any one or more of the web document and other web documents based on said high contrast mode of the client device, comprising selecting a first set of instructions to display the any one or more of the web document and other web documents when the client device is in high contrast mode and selecting a second set of instructions to display the any one or more of the web document and other web documents when the client device is not in high contrast mode.

5. The method of claim 1, wherein comparing the first color value to the computed color value comprises normalizing the computed color value to have an identical format as the first color value.

6. A system comprising:
   a processor; and
   a high contrast mode detection module configured to,
      create a web document object while processing a web document loaded into a web browser,
      assign a pre-determined color value to a displayable property of the web document object, wherein the displayable property comprises a color,
      associate the web document object to the web document
      generate a computed color display value for the web document object in response to the web document object being associated with the web document,
      compare the pre-determined color value to the computed color display value,
      generate a result based on comparison of the pre-determined color value to the computed color display value, wherein the result indicates whether the system is set to a high contrast setting,
      process one or more of the web document and other web documents based on the result, wherein the high contrast mode detection module is configured to process the one or more of the web document and other web documents based on the result being configured to select a first set of instructions to display the one or more of the web document and other web documents when the client device is in high contrast mode and select a second set of instructions to display the one or more of the web document and other web documents when the client device is not in high contrast mode,
      store the result in a variable, and
      send the variable to a server to process additional web documents, using the variable, before the additional web documents are loaded onto the client device.

7. The system of claim 6 further comprising:
   a network interface configured to connect to a communication network and receive the web document from a server; and
   a machine-readable storage medium to store the result of the comparison.

8. The system of claim 6, wherein the high contrast mode detection module utilizes one or more instructions in the web document to create the web document object, assign the predetermined color value, determine the computed color display value, and compare the pre-determined color value to the computed color display value.

9. A computer program product for determining whether a high contrast setting is enabled on a computer, the computer program product comprising:
a computer readable storage medium having computer readable program code embodied therewith, the computer readable program code comprising:
computer readable program code configured to
create a web document object using one or more instructions in the web document,
assign a first color value to a displayable property of the web document object wherein the displayable property of the web document object comprises a color, the first color value being pre-determined to be different than a second color value that a client device would use to display the web document object on the client device when the client device is in a high contrast mode, said second color value being a default high contrast color value stored on the client device,
associate the web document object with a web document, wherein said association of the web document object with the web document causes the client device to generate a computed color value to use for display of the web document object in the web document, wherein the client device generates the computed color value as the first color value when the client device is not in high contrast mode and wherein the client device generates the computed color value as the second color value when the client device is in high contrast mode,
compare the first color value to the computed color value of the web document object to determine whether the client device is in high contrast mode,
indicate that the client device is in high contrast mode if the first color value and the computed color value are different according to comparison of the first color value to the computed color value,
indicate that the client device is not in high contrast mode if the first color value and the computed color value are not different according to said comparison of the first color value to the computed color value,
process one or more of the web document and other web documents based on said high contrast mode of the client device,
select a first set of instructions to display the one or more of the web document and other web documents when the client device is in high contrast mode,
select a second set of instructions to display the one or more of the web document and other web documents when the client device is not in high contrast mode,
produce a result that indicates whether the client device is in high contrast mode in response to said comparison of the first color value to the computed color value of the web document object,
store the result in a variable, and
send the variable to a server to process additional web documents before they are loaded onto the client device.

10. The computer program product claim 9, said computer readable program code further configured to
use one or more instructions in the web document to create the web document object, assign the first color value to the displayable property of the web document object, associate the web document object with the web document, and compare the first color value to the computed color value of the web document object.

11. A method comprising:
creating a web document object;
assigning a first color value to a displayable property of the web document object, the first color value being pre-determined to be different than a second color value that a client device would use to display the web document object on the client device when the client device is in a high contrast mode, said second color value being a default high contrast color value stored on the client device, wherein the first color value comprises a color that does not have a highly contrasting color opposite and wherein the second color value comprises a color with a highly contrasting color opposite;
associating the web document object with a web document, wherein said associating causes the client device to generate a computed color value to use for display of the web document object in the web document, wherein the client device generates the computed color value as the first color value when the client device is not in high contrast mode and wherein the client device generates the computed color value as the second color value when the client device is in high contrast mode;
comparing the first color value to the computed color value of the web document object to determine whether the client device is in high contrast mode, said comparing generating a result that correlates to a high contrast setting value that indicates whether the high contrast mode is enabled or disabled;
processing a displayable portion of the web document based on the result of the comparing the first color value to the computer color value of the web document object, wherein processing the displayable portion of the web document comprises selecting a set of instructions embedded in the web document to apply to elements in the web document that do not display images or colors from a first cascading style sheet when the client device is in high contrast mode, wherein the set of instructions comprise any one or more of a second cascading style sheet and a set of image files;
producing a result based, at least in part, on said comparing the first color value to the computed color value of the web document object, wherein the result indicates whether the client device is in high contrast mode;
storing the result in a variable; and
sending the variable to a server to process additional web documents, using the variable, before the additional web documents are loaded onto the client device.

12. The method of claim 11, wherein the web document comprises one or more client-side scripts that perform said creating, assigning, associating, comparing, determining, and processing wherein the one or more client-side scripts are called while the web document is loading within an application on the client device, wherein the application processes the web document to generate the computed color display value.

* * * * *